(12) United States Patent
Pan et al.

(10) Patent No.: US 10,357,948 B2
(45) Date of Patent: Jul. 23, 2019

(54) SHRINK FILMS WITH HIGH TEAR RESISTANCE, AND METHODS OF MAKING THEREOF

(71) Applicants: Dow Global Technologies LLC, Midland, MI (US); Jian-ping Pan, Shanghai (CN); Yijian Lin, Pearland, TX (US); Xiao Bing Yun, Shanghai (CN); Mehmet Demirors, Pearland, TX (US)

(72) Inventors: Jian-ping Pan, Shanghai (CN); Yijian Lin, Pearland, TX (US); Xiao Bing Yun, Shanghai (CN); Mehmet Demirors, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 118 days.

(21) Appl. No.: 15/302,359

(22) PCT Filed: Apr. 16, 2014

(86) PCT No.: PCT/CN2014/075491
§ 371 (c)(1),
(2) Date: Oct. 6, 2016

(87) PCT Pub. No.: WO2015/157939
PCT Pub. Date: Oct. 22, 2015

(65) Prior Publication Data
US 2017/0021599 A1 Jan. 26, 2017

(51) Int. Cl.
| | |
|---|---|
| B32B 27/32 | (2006.01) |
| B29C 55/12 | (2006.01) |
| B32B 27/08 | (2006.01) |
| C08L 23/08 | (2006.01) |
| B29C 55/00 | (2006.01) |
| B32B 27/30 | (2006.01) |
| B29K 23/00 | (2006.01) |

(52) U.S. Cl.
CPC ............ *B32B 27/32* (2013.01); *B29C 55/005* (2013.01); *B29C 55/12* (2013.01); *B32B 27/08* (2013.01); *B32B 27/30* (2013.01); *C08L 23/0815* (2013.01); *B29K 2023/0608* (2013.01); *B32B 2250/03* (2013.01); *B32B 2250/242* (2013.01); *B32B 2250/40* (2013.01); *B32B 2270/00* (2013.01); *B32B 2307/412* (2013.01); *B32B 2307/518* (2013.01); *B32B 2307/54* (2013.01); *B32B 2307/5825* (2013.01); *B32B 2307/72* (2013.01); *B32B 2307/736* (2013.01); *B32B 2439/70* (2013.01)

(58) Field of Classification Search
CPC .. B32B 27/03; B29C 55/12; B29K 2023/0625
See application file for complete search history.

(56) References Cited

U.S. PATENT DOCUMENTS

| | | | |
|---|---|---|---|
| 3,456,044 | A | 7/1969 | Pahlke |
| 4,352,849 | A | 10/1982 | Mueller |
| 4,532,189 | A | 7/1985 | Mueller |
| 4,820,557 | A | 4/1989 | Warren |
| 4,837,084 | A | 6/1989 | Warren |
| 4,865,902 | A | 9/1989 | Golike et al. |
| 4,927,708 | A | 5/1990 | Herran et al. |
| 4,952,451 | A | 8/1990 | Mueller |
| 4,957,790 | A | 9/1990 | Warren |
| 4,963,419 | A | 10/1990 | Lustig et al. |
| 5,055,328 | A | 10/1991 | Evert et al. |
| 5,059,481 | A | 10/1991 | Lustig et al. |
| 6,045,882 | A | 4/2000 | Sandford |
| 6,287,613 | B1 | 9/2001 | Childress et al. |
| 6,423,421 | B1 * | 7/2002 | Banaszak ............... B32B 27/32 |
| | | | 428/516 |
| 6,514,583 | B1 | 2/2003 | Ahlgren et al. |
| 6,753,054 | B1 | 6/2004 | Lind et al. |
| 8,372,931 | B2 | 2/2013 | Hermel-Davidock et al. |
| 2011/0003940 | A1 * | 1/2011 | Karjala ................... C08F 10/00 |
| | | | 525/240 |
| 2011/0015346 | A1 | 1/2011 | Hermel-Davidock et al. |
| 2012/0100356 | A1 * | 4/2012 | Ohlsson ................ B32B 27/20 |
| | | | 428/213 |

(Continued)

FOREIGN PATENT DOCUMENTS

| | | |
|---|---|---|
| CA | 2178459 | 12/1996 |
| EP | 0388177 A2 | 9/1990 |

(Continued)

OTHER PUBLICATIONS 1488919.4—PCT/CN2014/075491, Extended European Search Report and Written Opinion dated Oct. 4, 2017.

(Continued)

*Primary Examiner* — Gregory Listvoyb

(57) ABSTRACT

A multilayer ethylene-based shrink films comprising a core layer comprising a polyethylene resin, and two skin layers, wherein the core layer is positioned between the two skin layers, wherein the polyethylene resin comprises greater than 50 mol. % of the units derived from ethylene and less than 30 mol. % of the units derived from one or more alpha-olefin comonomers, has greater than 50% of the copolymer fraction eluting between 75.0° C. and 95.0° C. as determined by Crystallization Elution Fractionation (CEF), and has a density ranging from 0.915 to 0.940 g/cc, and wherein the film is biaxially-oriented.

10 Claims, 2 Drawing Sheets

(56) References Cited

U.S. PATENT DOCUMENTS

2013/0144019 A1   6/2013  Demirors et al.

FOREIGN PATENT DOCUMENTS

| JP | 201012017 | 6/2010 |
|----|-----------|--------|
| WO | 1994007954 A1 | 4/1994 |
| WO | 2008132054 A1 | 11/2008 |
| WO | 2011159376 A1 | 12/2011 |
| WO | 2012/166469 A1 | 12/2012 |
| WO | 2013029223 A1 | 3/2013 |
| WO | 2013/056466 A1 | 4/2013 |
| WO | 2014/003926 A1 | 1/2014 |
| WO | 2015/132346 A1 | 9/2015 |

OTHER PUBLICATIONS

Monrabal, Macromol. Symp., 2007, vol. 257, p. 71-79.
PCT/CN2014/075491, International Search Report and Written Opinion dated Jan. 21, 2015.
PCT/CN2014/075491, International Preliminary Report on Patentability dated Oct. 27, 2016.

* cited by examiner

SHRINK FILMS WITH HIGH TEAR RESISTANCE, AND METHODS OF MAKING THEREOF

FIELD

Embodiments of the present disclosure generally relate to shrink films, and more particularly, to ethylene-based shrink films for display applications having high tear resistance.

BACKGROUND

Display shrink films have been commonly used in packaging of light goods. The films may be produced by a biaxial orientation process, which can provide and/or enhance certain desired film optical properties, such as, high gloss, transparency, and haze, certain film shrink properties, and certain film mechanical properties, such as, strength and stiffness. However, film tear resistance can be adversely affected by the biaxialorientation process. Low film tear resistance can lead to film breaks during packaging, storage and transportation. To enhance the tear strength of the biaxially-oriented films, polyolefin materials with low crystallinity, such as, ethylene vinyl acetate copolymers with high vinyl acetate comonomer content or ultra-low density polyethylenes, are often blended into the formulation. However, stiffness of the film can be compromised due to lowering of the film crystallinity.

Accordingly, alternative ethylene-based shrink films are desired.

SUMMARY

Disclosed in embodiments herein are ethylene-based shrink films. The films comprise a polyethylene resin, wherein the polyethylene resin comprises greater than 50 mol. % of the units derived from ethylene and less than 30 mol. % of the units derived from one or more alpha-olefin comonomers, has greater than 50% of the copolymer fraction eluting between 75.0° C. and 95.0° C. as determined by Crystallization Elution Fractionation (CEF), and has a density ranging from 0.915 to 0.940 g/cc, and wherein the film is biaxially-oriented.

Also disclosed in embodiments herein are multilayer ethylene-based shrink films. The films comprise a core layer comprising a polyethylene resin, and two skin layers, wherein the core layer is positioned between the two skin layers, wherein the polyethylene resin comprises greater than 50 mol. % of the units derived from ethylene and less than 30 mol. % of the units derived from one or more alpha-olefin comonomers, has greater than 50% of the copolymer fraction eluting between 75.0° C. and 95.0° C. as determined by Crystallization Elution Fractionation (CEF), and has a density ranging from 0.915 to 0.940 g/cc, and wherein the film is biaxially-oriented. Further, disclosed herein are articles comprising and methods of making the multilayer ethylene-based shrink films described herein.

Additional features and advantages of the embodiments will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing and the following description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
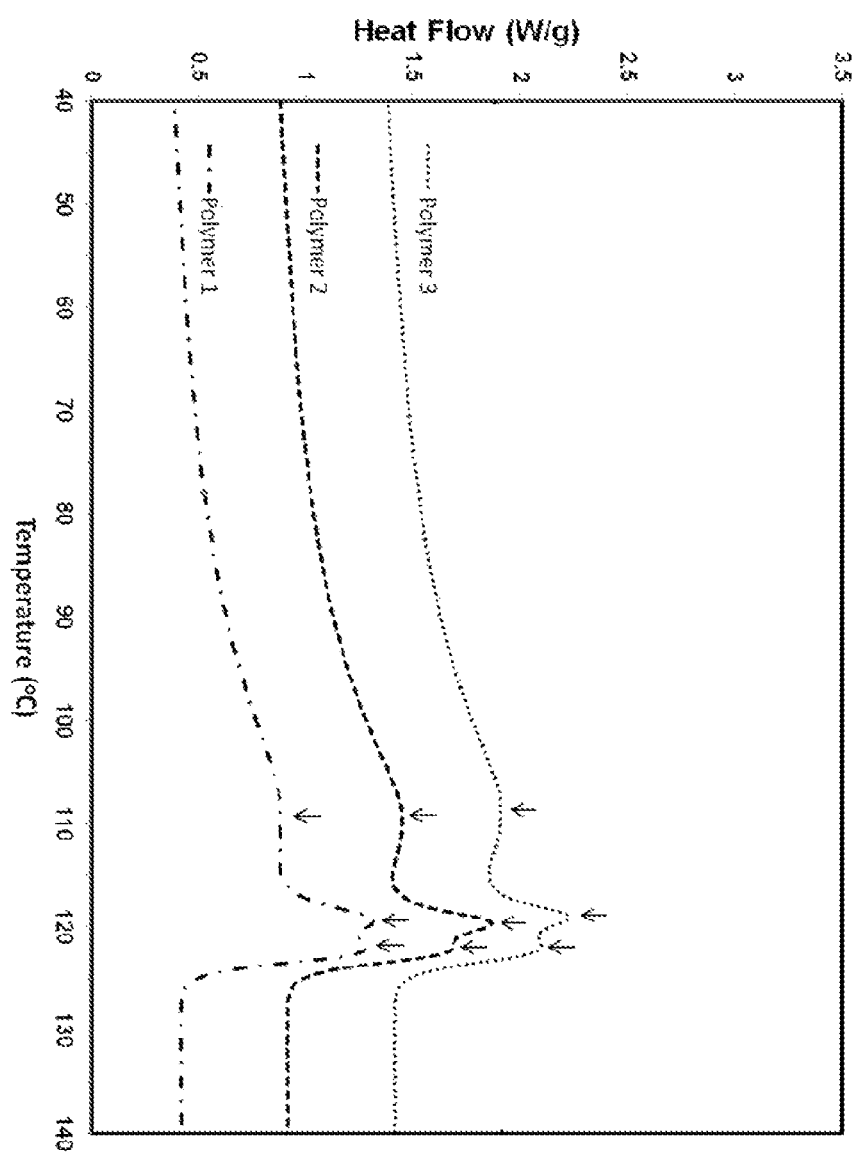
FIG. 1 graphically depicts a DSC second heating trace for the polyethylene resins used in inventive films according to one or more embodiments shown and described herein. The arrows indicate the melting point peaks.

Reference will now be made in detail to embodiments of ethylene-based shrink films, multilayer ethylene-based shrink films, articles, and methods thereof, examples of which are further described in the accompanying figures. The shrink films described herein may be used for secondary packaging of items, for example, food and drinks. It is noted, however, that this is merely an illustrative implementation of the embodiments disclosed herein. The embodiments are applicable to other technologies that are susceptible to similar problems as those discussed above. For example, shrink films may be used in other flexible packaging applications, such as, heavy duty shipping sacks, liners, sacks, stand-up pouches, detergent pouches, sachets, etc., all of which are within the purview of the present embodiments.

Disclosed are ethylene-based shrink films and multilayer ethylene-based shrink films that comprise a polyethylene resin. The ethylene-based and multilayer ethylene-based shrink films are biaxially-oriented and may be cross-linked. The term "ethylene-based" refers to films that contain polymers having more than 50 mol. % of a polymerized ethylene monomer (based on the total amount of polymerizable monomers) and, optionally, may contain at least one comonomer. The ethylene-based shrink films described herein may comprise at least 40 wt. % of the polyethylene resin. All individual values and subranges are included and disclosed herein. For example, in some embodiments, the ethylene-based shrink films comprise at least 50 wt. %, at least 60 wt. %, at least 70 wt. %, at least 75 wt. %, at least 80 wt. %, at least 85 wt. %, at least 90 wt. %, at least 95 wt. %, at least 99 wt. %, at least 100 wt. % of the polyethylene resin. In some embodiments, the ethylene-based shrink films may comprise a blend that further comprises one or more additional polyethylene resins. In those embodiments, the blend has an overall density ranging from 0.915 to 0.940 g/cc and has greater than 50% of the copolymer fraction eluting between 75.0° C. and 95.0° C. as determined by Crystallization Elution Fractionation (CEF).

The multilayer ethylene-based shrink films described herein comprise a core layer comprising a polyethylene resin and two skin layers, with the core layer being positioned between the two skin layers. The multilayer ethylene-based shrink films described herein may comprise at least 40 wt. % of the polyethylene resin. All individual values and subranges are included and disclosed herein. For example, in some embodiments, the multilayer ethylene-based shrink films comprise at least 50 wt. %, at least 60 wt. %, at least 70 wt. %, at least 75 wt. %, at least 80 wt. %, at least 85 wt. %, at least 90 wt. %, at least 95 wt. %, at least 99 wt. %, at least 100 wt. % of the polyethylene resin in the core layer. In some embodiments, core layer is a blend that further comprises one or more additional polyethylene resins, wherein the blend has an overall density ranging from 0.915 to 0.940 g/cc and has greater than 50% of the copolymer fraction eluting between 75.0° C. and 95.0° C. as determined by Crystallization Elution Fractionation (CEF).

The polyethylene resins found in the ethylene-based and multilayer ethylene-based shrink films, including the one or more additional polyethylene resins described above, comprise greater than 50 mol. %, for example, greater than or equal to 60 mol. %, greater than or equal to 70 mol. %, greater than or equal to 80 mol. %, or greater than or equal to 90 mol. % of the units derived from ethylene. The polyethylene resins also comprise less than 30 mol. %, for example, less than or equal to 25 mol. %, or less than or equal to 20 mol. %, or less than or equal to 10 mol. % of the units derived from one or more a-olefin comonomers. In some embodiments, the polyethylene resin comprises greater than 50 mol. % of the units derived from ethylene and less than 30 mol. % of the units derived from one or more alpha-olefin comonomers. The polyethylene resins are heterogeneously branched.

In embodiments herein, the alpha-olefin comonomers have no more than 20 carbon atoms. For example, in some embodiments, the alpha-olefin comonomers may have 3 to 10 carbon atoms, or 3 to 8 carbon atoms. Exemplary alpha-olefin comonomers include, but are not limited to, propylene, 1-butene, 1-pentene, 1-hexene, 1-heptene, 1-octene, 1-nonene, 1-decene, and 4-methyl-1-pentene. In some embodiments, the one or more alpha-olefin comonomers may be selected from the group consisting of propylene, 1-butene, 1-hexene, and 1-octene. In other embodiments, the one or more alpha-olefin comonomers may be selected from the group consisting of 1-hexene and 1-octene.

In embodiments herein, the polyethylene resins have greater than 50% of the copolymer fraction eluting between 75.0° C. and 95.0° C. as determined by Crystallization Elution Fractionation (CEF). The polyethylene resins have a density ranging from 0.915 to 0.940 g/cc. All individual values and subranges from 0.915 to 0.940 g/cc are included and disclosed herein. For example, in some embodiments, the polyethylene resin has a density of 0.915-0.935 g/cc. In other embodiments, the polyethylene resin has a density of 0.915-0.930 g/cc. The polyethylene resins have a melt index ($I_2$) of 0.1-5 g/10 min. All individual values and subranges from 0.1 to 5 g/10 min are included and disclosed herein. For example, in some embodiments, the polyethylene resin has a melt index of 0.1-3 g/10 min. In other embodiments, the polyethylene resin has a melt index of 0.1-2 g/10 min. In further embodiments, the polyethylene resin has a melt index of 0.5-1.5 g/10 min.

The polyethylene resins may have an $I_{10}/I_2$ ratio of 3 to 15. All individual values and subranges from 3 to 15 are included and disclosed herein. For example, in some embodiments, the polyethylene resin has an $I_{10}/I_2$ ratio of 4 to 12. In other embodiments, the polyethylene resin has an $I_{10}/I_2$ ratio of 6 to 12. In further embodiments, the polyethylene resin has an $I_{10}/I_2$ ratio of 6 to 10. In even further embodiments, the polyethylene resin has an $I_{10}/I_2$ ratio of 7 to 9.

The polyethylene resins may have a molecular weight distribution ($M_w/M_n$) of 1.5 to 6. All individual values and subranges from 1.5 to 6 are included and disclosed herein. For example, in some embodiments, the polyethylene resin has an $M_w/M_n$ of 1.7 to 5.5. In other embodiments, the polyethylene resin has an $M_w/M_n$ of 1.9 to 5.0. In further embodiments, the polyethylene resin has an $M_w/M_n$ of 2.5 to 4.5. In even further embodiments, the polyethylene resin has an $M_w/M_n$ of 3 to 4.5.

The polyethylene resins may have a molecular weight distribution ($M_z/M_w$) of from 1.5 to 4.5. All individual values and subranges from 1.5 to 4.5 are included herein and disclosed herein; for example, the polyethylene resins may have a molecular weight distribution ($M_z/M_w$) of from a lower limit of 1.5, 1.75, 2, 2.5, 2.75 to an upper limit of 2.85, 2.9, 3, 3.15, 3.25, 3.5, 3.65, 3.75, 3.9, 4, 4.25, or 4.5. For example, the polyethylene resins may have a molecular weight distribution ($M_z/M_w$) of from 1.5 to 4.5, from 2 to 3.5, from 2.5 to 3, or from 2.65 to 2.9.

The polyethylene resins may have a heat of fusion ranging from 132 to 182 J/g. All individual values and subranges from 132 to 182 J/g are included and disclosed herein. For example, in some embodiments, the polyethylene resin has a heat of fusion ranging from 135 to 175 J/g. In other embodiments, the polyethylene resin has a heat of fusion ranging from 140 to 165 J/g. In further embodiments, the polyethylene resin has a heat of fusion ranging from 145 to 155 J/g. Heat of fusion may be measured by differential scanning calorimetry (DSC) or equivalent technique.

The polyethylene resins may have a calculated % crystallinity ranging from 45%-62%. All individual values and subranges from 45%-62% are included and disclosed herein. For example, in some embodiments, the polyethylene resin has a calculated % crystallinity ranging from 47%-55%. In other embodiments, the polyethylene resin has a calculated % crystallinity ranging from 47%-53%. The % crystallinity for polyethylene resins may be calculated using the following equation:

$$\% \text{ Crystallinity} = \frac{\text{Heat of fusion (J/g)}}{292 \text{ J/g}} \times 100\%$$

As noted above, the heat of fusion may be measured by differential scanning calorimetry (DSC) or equivalent technique.

The polyethylene resins may have two or more melting point peaks and a melting point peak split between the lowest DSC melting point peak and the highest DSC melting point peak of less than 15° C. All individual values and subranges of less than 15° C. are included and disclosed herein. In some embodiments, the polyethylene resin may have two or more melting point peaks and a melting point peak split between the lowest DSC melting point peak and the highest DSC melting point peak of less than 14° C. In other embodiments, the polyethylene resin may have two or more melting point peaks and a melting point peak split between the lowest DSC melting point peak and the highest DSC melting point peak of 5-15° C. In further embodiments, the polyethylene resin may have two or more melting point peaks and a melting point peak split between the lowest DSC melting point peak and the highest DSC melting point peak of 10-15° C.

Any conventional ethylene (co)polymerization reaction processes may be employed to produce the polyethylene resin. Exemplary conventional ethylene (co)polymerization reaction processes include, but are not limited to, slurry phase polymerization process, solution phase polymerization process, and combinations thereof using one or more conventional reactors, e.g., loop reactors, stirred tank reactors, batch reactors in parallel, series, and/or any combinations thereof.

In some embodiments, the polyethylene resin may be produced using a solution-phase polymerization process. Such a process may occur in a well-stirred reactor such as a loop reactor or a sphere reactor at temperature from about 150° C. to about 300° C., or from about 180° C. to about 200° C., and at pressures from about 30 to about 1000 psi, or from about 600 to about 850 psi. The residence time in such a process is from about 2 to about 20 minutes, or from about 3 to about 10 minutes. Ethylene, solvent, catalyst, and optionally one or more comonomers are fed continuously to the reactor. Exemplary catalysts in these embodiments include, but are not limited to, Ziegler-Natta catalysts. Exemplary solvents include, but are not limited to, isoparaffins. For example, such solvents are commercially available under the name ISOPAR E (ExxonMobil Chemical Co., Houston, Tex.). The resultant mixture of ethylene-based polymer and solvent is then removed from the reactor and the polymer is isolated. Solvent is typically recovered via a solvent recovery unit, that is, heat exchangers and vapor liquid separator drum, and is recycled back into the polymerization system.

An exemplary multi-constituent catalyst system can include a Ziegler-Natta catalyst composition including a magnesium- and titanium-containing procatalyst and a cocatalyst. The procatalyst may, for example, comprise the reaction product of magnesium dichloride, an alkylaluminum dihalide, and a titanium alkoxide. The cocatalysts, which are reducing agents, may comprise aluminum compounds, but compounds of lithium, sodium and potassium, alkaline earth metals as well as compounds of other earth metals, other than aluminum, are possible. The compounds may be hydride, organometal or halide compounds. In some embodiments, the cocatalysts may be selected from the group comprising Al-trialkyls, Al-alkyl halides, Al-alkoxides and Al-alkoxy halides. In other embodiments, Al-Alkyls and Al-chlorides are used. In further embodiments, trimethyl aluminum, triethyl aluminum, tri-isobutyl aluminum, tri-n-hexyl aluminum, dimethyl aluminum chloride, diethyl aluminum chloride, ethyl aluminum dichloride and diisobutyl aluminum chloride, isobutylaluminum dichloride, may be used.

In some embodiments, the procatalyst may be a titanium-based Ziegler Natta catalyst, such as, for example, a titanium supported $MgCl_2$ Ziegler Natta catalyst characterized by a Ti:Mg ratio between 1.0:40 to 5.0:40, or a Ti:Mg ratio of 1.0:40 to 3.0:40, and the cocatalyst may be a triethylaluminum. In some embodiments, the Ti:Mg ratio may be 1.0:40. In other embodiments, the Ti:Mg ratio may be 3.0:40. The procatalyst and the cocatalyst components can be contacted either before entering the reactor or in the reactor. The Al:Ti molar ratio of cocatalyst component to procatalyst component can be from about 1:1 to about 15:1, about 1:1 to about 9:1 or about 1:1 to about 5:1.

As noted above, the multilayer ethylene-based shrink films described herein comprise a core layer comprising a polyethylene resin and two skin layers, with the core layer being positioned between the two skin layers. The thickness ratio of the two skin layers to the core layer can be any ratio suitable to maintain the optical and mechanical properties of a biaxially-oriented shrink film. In some embodiments, the thickness ratio of the two skin layers to the core layer may be 1:10 to 1:1, 1:5 to 1:1, or 1:4 to 1:1. The thickness ratio of the two skin layers to the core layer can also be captured by percentages. For example, in some embodiments, the core layer comprises from about 50 wt. % to about 95 wt. % of the overall film thickness. In other embodiments, the core layer comprises from about 60 wt. % to about 90 wt. % of the overall film thickness. In further embodiments, the core layer comprises from about 65 wt. % to about 85 wt. % of the overall film thickness. The two skin layers may have an equal thickness, or alternatively, may have an unequal thickness.

The two skin layers may independently comprise an ethylene-based resin having greater than 50 mol. % of the units derived from ethylene and less than 30 mol. % of the units derived from one or more alpha-olefin comonomers, and having a density ranging from 0.920 to 0.950. The ethylene-based resin in the two skin layers comprises greater than 50 mol. %, for example, greater than or equal to 60 mol. %, greater than or equal to 70 mol. %, greater than or equal to 80 mol. %, or greater than or equal to 90 mol. % of the units derived from ethylene. The ethylene-based resin in the two skin layers also comprises less than 30 mol. %, for example, less than or equal to 25 mol. %, or less than or equal to 20 mol. %, or less than or equal to 10 mol. % of the units derived from one or more alpha-olefin comonomers. In some embodiments, the ethylene-based resin in the two skin layers comprises greater than 50 mol. % of the units derived from ethylene and less than 30 mol. % of the units derived from one or more alpha-olefin comonomers. The alpha-olefin comonomers may have no more than 20 carbon atoms, and in some embodiments, the alpha-olefin comonomers may have 3 to 10 carbon atoms, or 3 to 8 carbon atoms. Exemplary alpha-olefin comonomers include, but are not limited to, propylene, 1-butene, 1-pentene, 1-hexene, 1-heptene, 1-octene, 1-nonene, 1-decene, and 4-methyl-1-pentene.

The ethylene-based resin in the two skin layers has a density ranging from 0.920 to 0.950 g/cc. All individual values and subranges from 0.920 to 0.950 g/cc are included and disclosed herein. For example, in some embodiments, the ethylene-based resin in the two skin layers has a density of 0.920-0.945 g/cc. In other embodiments, the ethylene-based resin in the two skin layers has a density of 0.920-0.940 g/cc. In further embodiments, the ethylene-based resin in the two skin layers has a density of 0.925-0.940 g/cc. In even further embodiments, the ethylene-based resin in the two skin layers has a density of 0.925-0.935 g/cc. The ethylene-based resin in the two skin layers may have a density that is at least 0.005, 0.007, 0.009, 0.010, 0.015, 0.020 g/cc higher than the density of the polyethylene resin in the core layer. The ethylene-based resin in the two skin layers may also have a density that is no more than 0.035 g/cc, 0.030, 0.025, 0.020, 0.015 higher than the density of the polyethylene resin in the core layer. In some embodiments, the ethylene-based resin in the two skin layers may have a density that is at least 0.005 higher than the density of the polyethylene resin in the core layer and no more than 0.035 g/cc higher than the density of the polyethylene resin in the core layer. In other embodiments, the ethylene-based resin in the two skin layers may have a density that is at least 0.005 higher than the density of the polyethylene resin in the core layer and no more than 0.025 g/cc higher than the density of the polyethylene resin in the core layer. In further embodiments, the ethylene-based resin in the two skin layers may have a density that is at least 0.007 higher than the density of the polyethylene resin in the core layer and no more than 0.020 g/cc higher than the density of the polyethylene resin in the core layer The ethylene-based resin in the two skin layers may have a melt index ($I_2$) of 0.1-5 g/10 min. All individual values and subranges from 0.1 to 5 g/10 min are included and disclosed herein. For example, in some embodiments, the ethylene-based resin in the two skin layers has a melt index of 0.1-3 g/10 min. In other embodiments, the ethylene-based resin in the two skin layers has a melt index of 0.1-2 g/10 min. In further embodiments, the ethylene-based resin in the two skin layers has a melt index of 0.5-1.5 g/10 min.

In embodiments herein, the ethylene-based shrink films described herein may exhibit an increase in average tear resistance as compared to a monolayer shrink film comprising a polyethylene resin having less than or equal to 50% of the copolymer fraction eluting between 75.0° C. and 95.0° C., as determined by Crystallization Elution Fractionation (CEF). In some embodiments, the ethylene-based shrink films may exhibit a 5% increase in average tear resistance as compared to a monolayer shrink film comprising a polyethylene resin having less than or equal to 50% of the copolymer fraction eluting between 75.0° C. and 95.0° C., as determined by Crystallization Elution Fractionation (CEF). In other embodiments, the ethylene-based shrink films may exhibit a 10% increase in average tear resistance as compared to a monolayer shrink film comprising a polyethylene resin having less than or equal to 50% of the copolymer fraction eluting between 75.0° C. and 95.0° C., as determined by Crystallization Elution Fractionation (CEF). In further embodiments, the ethylene-based shrink films may exhibit a 15% increase in average tear resistance as compared to a monolayer shrink film comprising a polyethylene resin having less than or equal to 50% of the copolymer fraction eluting between 75.0° C. and 95.0° C., as determined by Crystallization Elution Fractionation (CEF). In even further embodiments, the ethylene-based shrink films may exhibit a 20% increase in average tear resistance as compared to a monolayer shrink film comprising a polyethylene resin having less than or equal to 50% of the copolymer fraction eluting between 75.0° C. and 95.0° C., as determined by Crystallization Elution Fractionation (CEF).

In embodiments herein, the multilayer ethylene-based shrink films described herein may exhibit an increase in average tear resistance as compared to a multilayer shrink film comprising a polyethylene resin in the core layer having less than or equal to 50% of the copolymer fraction eluting between 75.0° C. and 95.0° C., as determined by Crystallization Elution Fractionation (CEF). In some embodiments, the multilayer ethylene-based shrink films may exhibit a 5% increase in average tear resistance as compared to multilayer shrink film, respectively, comprising a polyethylene resin in the core layer having less than or equal to 50% of the copolymer fraction eluting between 75.0° C. and 95.0° C., as determined by Crystallization Elution Fractionation (CEF). In other embodiments, the multilayer ethylene-based shrink films may exhibit a 10% increase in average tear resistance as compared to multilayer shrink film, respectively, comprising a polyethylene resin in the core layer having less than or equal to 50% of the copolymer fraction eluting between 75.0° C. and 95.0° C., as determined by Crystallization Elution Fractionation (CEF). In further embodiments, the multilayer ethylene-based shrink films may exhibit a 15% increase in average tear resistance as compared to multilayer shrink film, respectively, comprising a polyethylene resin in the core layer having less than or equal to 50% of the copolymer fraction eluting between 75.0° C. and 95.0° C., as determined by Crystallization Elution Fractionation (CEF). In even further embodiments, the multilayer ethylene-based shrink films may exhibit a 20% increase in average tear resistance as compared to multilayer shrink film, respectively, comprising a polyethylene resin in the core layer having less than or equal to 50% of the copolymer fraction eluting between 75.0° C. and 95.0° C., as determined by Crystallization Elution Fractionation (CEF). The average tear resistance for ethylene-based shrink films and multilayer shrink films is calculated as follows:

$$\text{average tear resistance} = \frac{(\text{Elmendorf Tear } (MD) + \text{Elmendorf Tear } (CD))}{2}$$

The ethylene-based shrink films and/or the multilayer ethylene-based shrink films described herein may be biaxially-oriented. In some embodiments, the ethylene-based shrink films and multilayer ethylene-based shrink films may be biaxially-oriented below its highest melting point. The highest melting point for the films herein may be determined by using the melting peak with the highest temperature as determined by DSC. The films may be biaxially oriented below its highest melting point using methods, such as, tenter framing, double bubble, trapped bubble, tape orientation or combinations thereof. In some embodiments, the films may be biaxially oriented below its highest melting point using a double bubble or tenter framing process. The films described herein are thought to be generally applicable to operations where the fabrication and orientation steps are separable as well as to operations where fabrication and orientation occur simultaneously or sequentially as part of the operation itself (e.g., a double bubble technique or tenter framing).

The ethylene-based shrink films and/or the multilayer ethylene-based shrink films described herein may be cross-linked. In some embodiments, electron beam can be used to cross-link. In other embodiment, the films may be formulated with a cross-linking agent, such as, pro-rad agents, including triallyl cyanurate as described by Warren in U.S. Pat. No. 4,957,790, and/or with antioxidant crosslink inhibitors, such as butylated hydroxytoluene as described by Evert et al. in U.S. Pat. No. 5,055,328.

One or more layers of the ethylene-based shrink films and/or the multilayer ethylene-based shrink films may further comprise additional components, such as, one or more other polymers and/or one or more additives. Example polymer additives have been described in Zweifel Hans et al., "Plastics Additives Handbook," Hanser Gardner Publications, Cincinnati, Ohio, 5th edition (2001), which is incorporated herein by reference in its entirety. Such additives include, but are not limited to, antistatic agents, color enhancers, dyes, lubricants, fillers, pigments, primary antioxidants, secondary antioxidants, processing aids, UV stabilizers, anti-blocks, slip agents, tackifiers, fire retardants, anti-microbial agents, odor reducer agents, anti-fungal agents, and combinations thereof. The total amount of the additives present in a layer of the ethylene-based shrink films and/or the multilayer ethylene-based shrink films may range from about 0.1 combined wt. % to about 10 combined wt. %, by weight of a layer.

The ethylene-based shrink films and/or the multilayer ethylene-based shrink films described herein may be manufactured by coextruding a primary tube, and biaxially orienting the primary tube to form a film. In some embodiments, the process comprises coextruding a multilayer primary tube, and biaxially orienting the multilayer primary tube to form a multilayer film. In other embodiments, the process comprises extruding a monolayer primary tube, and biaxially orienting the monolayer primary tube to form a monolayer film. Production of a monolayer shrink film is described in U.S. Patent Publication No. 20110003940, the disclosure of which is incorporated in its entirety herein by reference. Film manufacturing processes are also described in U.S. Pat. No. 3,456,044 (Pahlke), U.S. Pat. No. 4,352,849 (Mueller), U.S. Pat. Nos. 4,820,557 and 4,837,084 (both to Warren), U.S. Pat. No. 4,865,902 (Golike et al.), U.S. Pat. No. 4,927,708 (Henan et al.), U.S. Pat. No. 4,952,451 (Mueller), and U.S. Pat. Nos. 4,963,419, and 5,059,481 (both to Lustig et al.), the disclosures of which are incorporated herein by reference.

Processes for manufacturing ethylene-based shrink films and/or the multilayer ethylene-based shrink films described herein may also comprise irradiating the primary tube to form a cross-linked primary tube. Irradiation techniques useful for herein may include exposing the film to an irradiation source (beta or gamma) at an irradiation dosage level of up to 20 Mrad to crosslink the polymeric film. In some embodiments, the irradiation may be accomplished by using an electron beam (beta) irradiation device. Irradiation crosslinking can be induced before or after final film orientation, however, in some embodiments, irradiation crosslinking is induced before final orientation.

The ethylene-based shrink films and/or the multilayer ethylene-based shrink films described herein may be incorporated into articles, such as, packaging or wrapping films.

Test Methods

Unless otherwise stated, the following test methods are used. All test methods are current as of the filing date of this disclosure.

Density

Samples for density measurement are prepared according to ASTM D1928. Measurements are made using ASTM D792, Method B.

Melt Index

Melt index, or $I_2$, is determined according to ASTM D1238 at 190° C., 2.16 kg. Melt index, or $I_{10}$, is measured in accordance with ASTM D1238 at 190° C., 10 kg.

Crystallization Elution Fractionation

The Crystallization Elution Fractionation (CEF) method is conducted according to the method described in Monrabal et al, Macromol. Symp. 257, 71-79 (2007), which is incorporated herein by reference. The CEF instrument is equipped with an IR-4 detector (such as that sold commercially from PolymerChar, Spain) and a two angle light scattering detector Model 2040 (such as those sold commercially from Precision Detectors). The IR-4 detector operates in the compositional mode with two filters: C006 and B057. A 10 micron guard column of 50 mm×4.6 mm (such as that sold commercially from PolymerLabs) is installed before the IR-4 detector in the detector oven. Ortho-dichlorobenzene (ODCB, 99% anhydrous grade) and 2,5-di-tert-butyl-4-methylphenol (BHT) (such as commercially available from Sigma-Aldrich) are obtained. Silica gel 40 (particle size 0.2~0.5 mm) (such as commercially available from EMD Chemicals) is also obtained. The silica gel is dried in a vacuum oven at 160° C. for about two hours before use. Eight hundred milligrams of BHT and five grams of silica gel are added to two liters of ODCB. ODCB containing BHT and silica gel is hereinafter referred to as "ODCB-m." ODCB-m is sparged with dried nitrogen ($N_2$) for one hour before use. Dried nitrogen is obtained by passing nitrogen at <90 psig over $CaCO_3$ and 5 Å molecular sieves. A sample solution is prepared by, using the autosampler, dissolving a polymer sample in ODCB-m at 4 mg/ml under shaking at 160° C. for 2 hours. 300 μL of the sample solution is injected into the column. The temperature profile of CEF is: crystallization at 3° C./min from 110° C. to 30° C., thermal equilibrium at 30° C. for 5 minutes (including Soluble Fraction Elution Time being set as 2 minutes), and elution at 3° C./min from 30° C. to 140° C. The flow rate during crystallization is 0.052 mL/min. The flow rate during elution is 0.50 mL/min. The IR-4 signal data is collected at one data point/second.

The CEF column is packed with glass beads at 125 μm±6% (such as those commercially available from MO-SCI Specialty Products) with ⅛ inch stainless tubing according to U.S. 2011/0015346 A1. The internal liquid volume of the CEF column is between 2.1 mL and 2.3 mL. Temperature calibration is performed by using a mixture of NIST Standard Reference Material linear polyethylene 1475a (1.0 mg/ml) and Eicosane (2 mg/ml) in ODCB-m. The calibration consists of four steps: (1) calculating the delay volume defined as the temperature offset between the measured peak elution temperature of Eicosane minus 30.00° C.; (2) subtracting the temperature offset of the elution temperature from the CEF raw temperature data. It is noted that this temperature offset is a function of experimental conditions, such as elution temperature, elution flow rate, etc.; (3) creating a linear calibration line transforming the elution temperature across a range of 30.00° C. and 140.00° C. such that NIST linear polyethylene 1475a has a peak temperature at 101.00° C., and Eicosane has a peak temperature of 30.00° C., (4) for the soluble fraction measured isothermally at 30° C., the elution temperature is extrapolated linearly by using the elution heating rate of 3° C./min. The reported elution peak temperatures are obtained such that the observed comonomer content calibration curve agrees with those previously reported in U.S. Pat. No. 8,372,931.

The copolymer fraction of the materials eluting in the elution temperature range between 75.0 and 95.0° C., $CPF_{75-95}$, is defined as the integral of the IR-4 chromatogram (baseline subtracted measurement channel) in the elution temperature ranging from 75.0 to 95.0° C. divided by the total integral from 25.5 to 118.0° C. according to the follow equation:

$$CPF_{75-95} = \frac{\int_{75}^{95} IR\,dT}{\int_{25.5}^{118} IR\,dT} \times 100\%$$

where T is the elution temperature (from the calibration discussed above).

The copolymer fraction of the materials eluting in the elution temperature range above 95.0° C., $CPF_{95-118}$, is defined as the integral of the IR-4 chromatogram (baseline subtracted measurement channel) in the elution temperature above 95.0° C. divided by the total integral from 25.5 to 118.0° C. according to the follow equation:

$$CPF_{95-118} = \frac{\int_{95}^{118} IR\,dT}{\int_{25.5}^{118} IR\,dT} \times 100\%$$

where T is the elution temperature (from the calibration discussed above).

A linear baseline is calculated by selecting two data points: one before the polymer elutes, usually at a temperature of 25.5° C., and another one after the polymer elutes, usually at 118° C. For each data point, the detector signal is subtracted from the baseline before integration.

GPC Method

The gel permeation chromatographic system consists of either a Polymer Laboratories Model PL-210 or a Polymer Laboratories Model PL-220 instrument. The column and carousel compartments are operated at 140° C. Three Polymer Laboratories 10-micron Mixed-B columns are used. The solvent is 1,2,4-trichlorobenzene. The samples are prepared at a concentration of 0.1 grams of polymer in 50 milliliters of solvent containing 200 ppm of butylated hydroxytoluene (BHT). Samples are prepared by agitating lightly for 2 hours at 160° C. The injection volume used is 100 microliters and the flow rate is 1.0 ml/minute.

Calibration of the GPC column set is performed with 21 narrow molecular weight distribution polystyrene standards with molecular weights ranging from 580 to 8,400,000, arranged in 6 "cocktail" mixtures with at least a decade of separation between individual molecular weights. The standards are purchased from Polymer Laboratories (Shropshire, UK). The polystyrene standards are prepared at 0.025 grams in 50 milliliters of solvent for molecular weights equal to or greater than 1,000,000, and 0.05 grams in 50 milliliters of solvent for molecular weights less than 1,000,000. The polystyrene standards are dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weights using the following equation (as described in Williams and Ward, J. Polym. Sci., Polym. Let., 6, 621 (1968)): $M_{polyethylene}=0.4316 \times (M_{polystyrene})$. Polyethylene equivalent molecular weight calculations are performed using Viscotek TriSEC software Version 3.0.

Number-, weight- and z-average molecular weights were calculated according to the following equations:

$$M_n = \frac{\sum_i Wf_i}{\sum_i (WF_i/M_i)}$$

$$M_w = \frac{\sum_i (Wf_i * M_i)}{\sum_i Wf_i}$$

$$M_z = \frac{\sum_i (Wf_i * M_i^2)}{\sum_i Wf_i * M_i}$$

wherein Mn is the number average molecular weight, Mw, is the weight average molecular weight, Mz is the z-average molecular weight, $Wf_i$ is the weight fraction of the molecules with a molecular weight of $M_i$.

Ultimate Tensile Strength, Ultimate Elongation, 2% Secant Modulus, & Average 2% Secant Modulus Ultimate tensile strength, ultimate elongation, and 2% secant modulus (sec. mod.) were measured in the machine direction (MD) and cross direction (CD) with an Instron universal tester according to ASTM D882-12. The Average 2% Secant Modulus was calculated as follows:

$$\text{Avg. 2\% Sec. Mod.} = \frac{(\text{Measured 2\% Sec. Mod. } (MD) + \text{Measured 2\% Sec. Mod. } (CD))}{2}$$

Elmendorf Tear

Elmendorf tear (type B) was measured in accordance with ASTM D-1922.

Differential Scanning Calorimetry (DSC)

Baseline calibration of the TA DSC Q1000 was performed by using the calibration wizard in the software. First, a baseline was obtained by heating the cell from −80° C. to 280° C. without any sample in the aluminum DSC pan. After that, sapphire standards were used according to the instructions in the wizard. Then about 1-2 mg of a fresh indium sample was analyzed by heating the sample to 180° C., cooling the sample to 120° C. at a cooling rate of 10° C./min followed by keeping the sample isothermally at 120° C. for 1 min, followed by heating the sample from 120° C. to 180° C. at a heating rate of 10° C./min. The heat of fusion and the onset of melting of the indium sample were determined and checked to be within 0.5° C. from 156.6° C. for the onset of melting and within 0.5 J/g from 28.71 J/g for the heat of fusion. Then deionized water was analyzed by cooling a small drop of fresh sample in the DSC pan from 25° C. to −30° C. at a cooling rate of 10° C./min. The sample was kept isothermally at 30° C. for 2 minutes and heated to 30° C. at a heating rate of 10° C./min. The onset of melting was determined and checked to be within 0.5° C. from 0° C. Samples of polymer were then pressed into a thin film at a temperature of 177° F. About 5 to 8 mg of sample was weighed out and placed in a DSC pan. A lid was crimped on the pan to ensure a closed atmosphere. The sample pan was placed in the DSC cell and then heated at a high rate of about 100° C./min to a temperature of about 30° C. above the polymer melt temperature. The sample was kept at this temperature for 5 minutes. Then the sample was cooled at a rate of 10° C./min to −40° C., and kept isothermally at that temperature for 5 minutes. Consequently the sample was heated at a rate of 10° C./min until melting was complete to generate a $2^{nd}$ heating curve. The heat of fusion was obtained from the $2^{nd}$ heating curves. The % crystallinity for polyethylene resins may be calculated using the following equation:

$$\text{\% Crystallinity} = \frac{\text{Heat of fusion (J/g)}}{292 \text{ J/g}} \times 100\%$$

EXAMPLES

The following materials are used in the Example described below.

Catalyst

The preparation of the procatalyst is conducted as follows:

Procatalyst A was prepared according to the following procedure. Ethylaluminium dichloride (EADC) solution (15 wt % EADC dissolved in Isopar E) was transferred into the stirred vessel containing magnesium chloride (MgCl$_2$) slurry (0.2M in Isopar E) and allowed to age while stirring for 6 hours prior to use. Titanium (IV) chloride (TiCl$_4$) and vanadium (V) oxytrichloride (VOCl$_3$) were mixed. The mixture of TiCl$_4$ and VOCl$_3$ was then transferred to the MgCl$_2$/EADC slurry vessel, followed by at least 8 hours of aging to obtain the procatalyst. The ratio of MgCl$_2$:EADC:TiCl$_4$:VOCl$_3$ was such that the metal ratio (Mg:Al:Ti:V) in the procatalyst A was 40:12:5:2.

Procatalyst 1 was prepared according to the following procedure. Ethylaluminium dichloride (EADC) solution (15 wt % EADC dissolved in Isopar E) was transferred into the stirred vessel containing magnesium chloride (MgCl$_2$) slurry (0.2M in Isopar E) and let to age while stirring for 6 hours prior to use. Titanium tetraisopropoxide (Ti(OiPr)$_4$) was transferred to the MgCl$_2$/EADC slurry vessel, followed by at least 8 hours of aging to obtain the procatalyst. The ratio of MgCl$_2$:EADC:Ti(OiPr)$_4$ was such that the metal ratio (Mg:Al:Ti) in the procatalyst 1 was 40:12.5:3.

Procatalyst 2 was prepared according to the following procedure. Ethylaluminium dichloride (EADC) solution (15 wt % EADC dissolved in Isopar E) was transferred into the stirred vessel containing magnesium chloride (MgCl$_2$) slurry (0.2M in Isopar E) and let to age while stirring for 6 hours prior to use. Titanium (IV) chloride (TiCl$_4$) was transferred to the MgCl$_2$/EADC slurry vessel, followed by at least 8 hours of aging to obtain the procatalyst. The ratio of MgCl$_2$:EADC:TiCl$_4$ was such that the metal ratio (Mg:Al:Ti) in the procatalyst 2 was 40:8:1.

Exemplary Polymers

The polyethylene resins are produced via a solution polymerization according to the following exemplary process. All raw materials (ethylene, 1-octene) and the process solvent (a narrow boiling range high-purity isoparaffinic solvent, commercially available under the trade name Isopar E from ExxonMobil Corporation) are purified with molecular sieves before introduction into the reaction environment. Hydrogen is supplied in pressurized cylinders as a high purity grade and is not further purified. The reactor monomer feed (ethylene) stream is pressurized via mechanical compressor to a pressure that is above the reaction pressure, approximately to 750 psig. The solvent and comonomer (1-octene) feed is pressurized via mechanical positive displacement pump to a pressure that is above the reaction pressure, approximately 750 psig. The individual catalyst components as described below in Table I can be manually batch diluted to specified component concentrations with purified solvent (Isopar E) and pressurized to a pressure that is above the reaction pressure, approximately 750 psig. All reaction feed flows can be measured with mass flow meters, independently controlled with computer automated valve control systems. The combined solvent, monomer, comonomer and hydrogen feed to the reactor is independently temperature controlled to anywhere between 5° C. to 50° C. by passing the feed stream through a heat exchanger. The fresh comonomer feed to the reactor can be manually aligned to add comonomer to the first reactor or the common solvent. The total fresh feed to the reactor is injected into the reactor at two locations. The fresh feed is controlled typically with each injector receiving half of the total fresh feed mass flow. The catalyst components are injected into the reactor through specially designed injection stingers and are each separately injected into the same relative location in the reactor with no contact time prior to the reactor. The pro-catalyst component feed is computer controlled to maintain the reactor monomer concentration at a specified target. The cocatalyst component is fed based on calculated specified molar ratios to the pro-catalyst component. Immediately following each fresh injection location (either feed or catalyst), the feed streams are mixed with the circulating polymerization reactor contents with static mixing elements. The contents of the reactor are continuously circulated through heat exchangers responsible for removing much of the heat of reaction and with the temperature of the coolant side responsible for maintaining isothermal reaction environment at the specified temperature. Circulation around each reactor loop is provided by a screw pump. The effluent from the reactor (containing solvent, monomer, comonomer, hydrogen, catalyst components, and molten polymer) is contacted with a deactivating agent, e.g. water, to stop the reaction. In addition, various additives, such as, antioxidants, can be added at this point. The stream then goes through another set of static mixing elements to evenly disperse the catalyst deactivating agent and additives. Following additive addition, the effluent (containing solvent, monomer, comonomer, hydrogen, catalyst components, and molten polymer) passes through a heat exchanger to raise the stream temperature in preparation for separation of the polymer from the other lower boiling reaction components. The stream then enters a two stage separation and devolatilization system where the polymer is removed from the solvent, hydrogen, and unreacted monomer and comonomer. The recycled stream is purified before entering the reactor again.

TABLE 1

| | Units | Comparative Polymer A | Polymer 1 | Polymer 2 |
|---|---|---|---|---|
| REACTOR FEEDS | | | | |
| Reactor Feed Temperature | ° C. | 40.05 | 39.91 | 39.84 |
| Reactor Total Solvent Flow | lbs/h | 1423.19 | 1421.45 | 1423.36 |
| Reactor Fresh Ethylene Flow | lbs/h | 373.88 | 373.93 | 373.87 |
| Reactor Total Ethylene Flow | lbs/h | 385.47 | 385.50 | 385.40 |
| Comonomer Type Used | | 1-octene | 1-octene | 1-octene |
| Reactor Fresh Comonomer Flow | lbs/h | 43.37 | 39.61 | 38.20 |
| Reactor Total Comonomer Flow | lbs/h | 241.36 | 189.89 | 175.82 |
| Reactor Comonomer/Olefin Ratio | % | 38.49 | 33.00 | 31.31 |
| Reactor Feed Solvent/Ethylene Ratio | Ratio | 3.80 | 3.80 | 3.81 |
| Reactor Fresh Hydrogen Flow | sccm | 1762.42 | 1120 | 681.99 |
| Reactor Hydrogen Mole Percent | mol % | 0.07 | 0.0461 | 0.03 |
| REACTION | | | | |
| Reactor Control Temperature | ° C. | 191.99 | 192.00 | 188.00 |
| Reactor Pressure | psig | 725.00 | 725.00 | 725.09 |
| Reactor Ethylene Conversion | % | 93.54 | 93.77 | 93.59 |
| Reactor FTnIR Exit C2 Conc. (cor.) | g/L | 8.33 | 8.09 | 8.34 |
| Reactor FTnIR Correction Factor | g/L | −3.45 | −3.01 | −3.16 |
| Reactor FTnIR Exit C8 Conc. (raw) | g/L | 52.58 | 37.62 | 34.33 |
| Reactor Log Viscosity | — | 3.11 | 3.13 | 3.14 |
| Reactor Percent Solids | % | 22.44 | 22.32 | 22.15 |
| Reactor Polymer Residence Time | hrs | 0.11 | 0.11 | 0.11 |
| P-216 Delta Pressure | psig | 57.10 | 60.45 | 60.48 |
| E-216B Tempered Water Inlet Temperature | ° C. | 152.25 | 151.86 | 146.91 |
| E-216B Heat Transfer Coefficient | BTU/hr ft$^3$ ° F. | 34.92 | 35.24 | 34.18 |
| R-216 Solution Density | lb/ft$^3$ | 37.48 | 37.59 | 37.78 |
| Vent Ethylene Conversion | % | 93.53 | 93.77 | 93.59 |

TABLE 1-continued

|  | Units | Comparative Polymer A | Polymer 1 | Polymer 2 |
|---|---|---|---|---|
| Reactor Production Rate | lbs/h | 100.00 | 100.00 | 100.00 |
| Total production rate from MB | lbs/h | 404.33 | 401.26 | 399.05 |
| 3. CATALYST |  |  |  |  |
| Reactor Pro-Catalyst Type |  | Procatalyst A | Procatalyst 1 | Procatalyst 2 |
| Reactor Pro-Catalyst Flow | lbs/h | 2.19 | 0.99 | 2.60 |
| Reactor Pro-Catalyst Concentration | ppm | 623.17 | 799.95 | 259.95 |
| Reactor Pro-Catalyst Efficiency | MM Lb | 0.30 | 0.51 | 0.59 |
| Reactor Co-Catalyst Type |  | (TEA) triethylaluminum | (TEA) triethylaluminum | (TEA) triethylaluminum |
| Reactor Co-Catalyst Flow | lbs/h | 1.30 | 0.75 | 1.66 |
| Reactor Co-Catalyst Concentration | ppm | 9999 | 9998.84 | 9998.84 |

Properties of Exemplary Polymers

TABLE 2

|  | Comparative Polymer A | Polymer 1 | Polymer 2 |
|---|---|---|---|
| Density (g/cm$^3$) | 0.921 | 0.9207 | 0.922 |
| $I_2$ (g/10 minutes) | 1.02 | 0.95 | 0.98 |
| $I_{10}/I_2$ | 7.5 | 8.05 | 7.94 |
| Wt. % of Material Eluting Between 75.0° C. and 95.0° C. | 38.3 | 51.0 | 55.7 |
| Wt. % of Material Eluting Above 95.0° C. | 32.2 | 22.1 | 20.0 |
| $M_n$ | 34,056 | 33,182 | 30,495 |
| $M_w$ | 117,059 | 119,624 | 112,526 |
| $M_z$ | 326,022 | 350,330 | 313,311 |
| $M_w/M_n$ | 3.44 | 3.61 | 3.69 |
| $M_z/M_w$ | 2.79 | 2.93 | 2.78 |
| Heat of fusion (J/g) | 149 | 147 | 149 |
| % Cryst. | 51% | 50% | 51% |

Films

TABLE 3

Resins Used in Films

| Name | Density (g/cc) | Melt Index (g/10 min) | CPF (%) |
|---|---|---|---|
| DOWLEX ™ 2045G, commercially available from The Dow Chemical Company (Midland, MI USA). | 0.920 | 0.96 | 48.2 |
| DOWLEX ™ 2042G, commercially available from The Dow Chemical Company (Midland, MI USA). | 0.930 | 1.0 | 49.3% |
| BLEND A: 60% DOWLEX ™ 2045G + 40% ATTANE ™ 4203 (commercially available from The Dow Chemical Company (Midland, MI USA) | 0.914 | 0.91 | 39.4% |
| Comparative Polymer A | 0.921 | 1.02 | 38.3 |
| Polymer 1 | 0.920 | 0.95 | 55.7 |
| Polymer 2 | 0.922 | 0.98 | 51.2 |
| Polymer 3 (Dowlex NG 5056G, commercially available from The Dow Chemical Company, Midland, MI USA) | 0.919 | 1.05 | 55.7 |

Blend A was made by a dry blend process.

Referring to FIG. 1, DSC second heating traces for polyethylene resins used in inventive films according to one or more embodiments shown and described herein are depicted. The arrows indicate the melting point peaks. Polymer 1 has more than two melting point peaks and has a melting point peak split between the lowest DSC melting point peak and the highest DSC melting point peak of about 13.2° C. Polymer 2 has more than two melting point peaks and has a melting point peak split between the lowest DSC melting point peak and the highest DSC melting point peak of about 12.7° C. Polymer 3 has more than two melting point peaks and has a melting point peak split between the lowest DSC melting point peak and the highest DSC melting point peak of about 12.7° C.

Film Process

Double bubble films were produced on a double bubble film line. A 3-layer primary tube was coextruded using Dowlex™ 2042G in the skin layers. The materials used in the core layer are specified in Table 4. The primary tube was crosslinked by electron beam (E-beam) before the second bubble blow-up step to enhance bubble stability. Orientation temperature was about 105-110° C. The orientation ratio in both machine direction (MD) and cross direction (CD) was around 5 times with respect to the dimension of the primary tube. Film thickness was about 0.7 mil.

TABLE 4

Film Structures

|  | Skin layer (15 wt. %) | Core Layer (70 wt. %) | Skin layer (15 wt. %) |
|---|---|---|---|
| ComparativeFilm A | DOWLEX ™ 2042G | DOWLEX ™ 2045G | DOWLEX ™ 2042G |
| Comparative Film B | DOWLEX ™ 2042G | Comparative Polymer A | DOWLEX ™ 2042G |
| Comparative Film C | DOWLEX ™ 2042G | Blend A | DOWLEX ™ 2042G |
| Inventive Film 1 | DOWLEX ™ 2042G | Polymer 1 | DOWLEX ™ 2042G |
| Inventive Film 2 | DOWLEX ™ 2042G | Polymer 2 | DOWLEX ™ 2042G |
| Inventive Film 3 | DOWLEX ™ 2042G | Polymer 3 | DOWLEX ™ 2042G |

The physical properties of the films were measure and are listed below in Table 5. As shown below, the ultimate tensile strength, 2% secant modulus, and ultimate elongation are not significantly affected for films 1, 2, and 3, as compared to the comparative film. However, the Elmendorf tear shows an improvement in at least one of the machine direction or the cross direction.

TABLE 5

Film Properties

| | Units | Comp. Film A | Comp. Film B | Comp. Film C | Inv. Film 1 | Inv. Film 2 | Inv. Film 3 |
|---|---|---|---|---|---|---|---|
| CPF$_{75-95}$ of the core layer material (%) | | 48.2 | 38.3 | 39.4 | 51.0 | 55.7 | 55.7 |
| Thickness | μm | 19.4 | 22 | 21 | 25 | 21 | 19.5 |
| Ultimate Tensile Strength (MD) | MPa | 137.3 | 104 | 104 | 94.1 | 91.3 | 127.6 |
| Ultimate Elongation (MD) | % | 122 | 109.2 | 105.5 | 111.9 | 110.8 | 108 |
| 2% Secant Modulus (MD) | MPa | 392.8 | 334.1 | 312.4 | 345 | 348.8 | 432 |
| Ultimate Tensile Strength (CD) | MPa | 124.1 | 116 | 103 | 80.1 | 103 | 123.5 |
| Ultimate Elongation (CD) | % | 105 | 97.7 | 99.1 | 89.9 | 100.4 | 109 |
| 2% Secant Modulus (CD) | MPa | 489.3 | 412.3 | 351.3 | 402.2 | 456.7 | 380.3 |
| Average 2% Secant Modulus | MPa | 441.1 | 373.2 | 331.9 | 373.6 | 402.8 | 406.2 |
| Elmendorf Tear (MD) | g | 15.4 | 12.9 | 19 | 21.5 | 23.1 | 26.8 |
| Elmendorf Tear (CD) | g | 16.2 | 15.7 | 17 | 29 | 36.4 | 27.6 |
| Average Tear Resistance | g | 15.8 | 14.3 | 18.0 | 25.3 | 29.8 | 27.2 |

Figure 2:
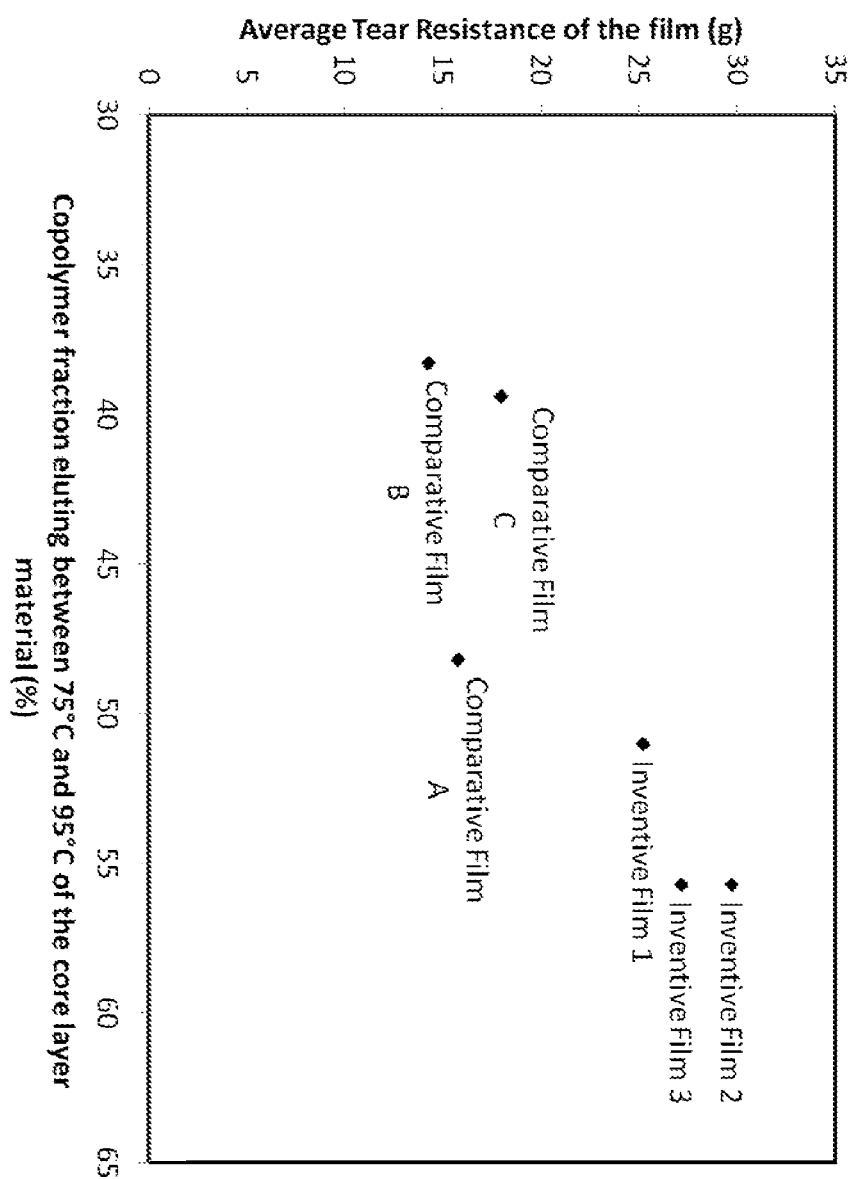
FIG. 2 graphically depicts the relationship between the copolymer fraction of the polyethylene resin in the core layer and average tear resistance for multilayer ethylene-based shrink films according to one or more embodiments shown and described herein and comparative shrink films.

Referring to FIG. 2, the relationship between the copolymer fraction of the polyethylene resin in the core layer and average tear resistance is depicted. As shown, the inventive multilayer ethylene-based shrink films, which comprise a polyethylene resin having greater than 50% of the copolymer fraction eluting between 75.0° C. and 95.0° C. as determined by Crystallization Elution Fractionation (CEF) in the core layer, possess a higher average tear resistance than multilayer ethylene-based shrink films that comprise a polyethylene resin having less than 50% of the copolymer fraction eluting between 75.0° C. and 95.0° C. as determined by Crystallization Elution Fractionation (CEF) in the core layer.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, if any, including any cross-referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

The invention claimed is:

1. A multilayer ethylene-based shrink film comprising:
a core layer comprising a polyethylene resin; and
two skin layers, wherein the two skin layers independently comprise an ethylene-based resin having greater than 50 mol. % of the units derived from ethylene and less than 30 mol. % of the units derived from one or more alpha-olefin comonomers, and having a density ranging from 0.920 to 0.950 g/cc, and the ethylene-based resin in the two skin layers has a density that is at least 0.005 g/cc higher than the density of the polyethylene resin in the core layer;
wherein the core layer is positioned between the two skin layers; and
wherein the polyethylene resin:
comprises greater than 50 mol. % of the units derived from ethylene and less than 30 mol. % of the units derived from one or more alpha-olefin comonomers;
has greater than 50% of the copolymer fraction eluting between 75.0° C. and 95.0° C. as determined by Crystallization Elution Fractionation (CEF); and
has a density ranging from 0.915 to 0.940 g/cc; and
wherein the film is biaxially-oriented.

2. The film of claim 1, wherein the polyethylene resin in the core layer has a melt index from 0.1 to 5 g/10 min.

3. The film of claim 1, wherein the core layer is a blend that further comprises one or more additional polyethylene resins, wherein the blend has a density ranging from 0.915 to 0.940 g/cc and has greater than 50% of the copolymer fraction eluting between 75.0° C. and 95.0° C. as determined by Crystallization Elution Fractionation (CEF).

4. The film of claim 1, wherein the polyethylene resin in the core layer comprises at least 40 wt. % of the core layer.

5. The film of claim 1, wherein the core layer comprises from 50% to 95% of the total thickness of the film.

6. The film of claim 1, wherein the ethylene-based resin in the two skin layers has a melt index from 0.1 to 5 g/10 min.

7. The film of claim 1, wherein the film is cross-linked.

8. The film of claim 1, wherein the film is biaxially-oriented below its highest melting point.

9. The film of claim 1, wherein the film exhibits an increase in average tear resistance as compared to a multilayer shrink film comprising a polyethylene resin in the core layer having less than or equal to 50% of the copolymer fraction eluting between 75.0° C. and 95.0° C., as determined by Crystallization Elution Fractionation (CEF).

10. An article comprising the film of claim 1.

* * * * *